Nov. 26, 1940.  C. M. DALEY, JR  2,223,000
STEPPING RULE
Filed July 7, 1939

WITNESS:
Rob't P. Mitchel

INVENTOR
Charles M. Daley, Jr.
BY
Augustus B. Stoughton
ATTORNEY.

Patented Nov. 26, 1940

2,223,000

UNITED STATES PATENT OFFICE 2,223,000

STEPPING RULE

Charles M. Daley, Jr., Norwood, Pa.

Application July 7, 1939, Serial No. 283,173

3 Claims. (Cl. 33—179)

In order to splice some electrical conductors or cables the metal core or conductor is stripped of insulation leaving a portion of the core projecting beyond the insulation, more of the insulation is then further stripped from the cable in such a way that the insulation which remains on the cable is in the form of steps of succeedingly larger diameter, the ends of the metallic cores are then suitably joined together and finally a pointed sheet of insulating material is wound around the joint and the stepped insulation until the outside diameter of the built-up insulation at the joint is the same as the diameter of the insulation throughout the length of the cable. It is necessary that the corresponding steps of the insulation that remain on each side of the joint be substantially identical.

The principal object of the present invention is to provide a stepping rule adapted to measure the diameter of corresponding steps in the insulation so that they may be made substantially identical.

Another object of the present invention is to provide a stepping rule having a wire strand or the like adapted to measure the perimeter of an object by application to a portion of the object intermediate of its ends by wrapping the strand or the like around the object, and by applying it in loop form over one end of the object.

Other objects will appear from the following description at the end of which the invention will be claimed.

Generally stated, the invention comprises a shank or scale piece provided with scale markings, a slider movably and detachably mounted on the shank and having windows and indices, a strand as of wire having one end attached to the shank and the other end attached to the slider so that when the slider is detached from the shank the strand can be passed around an object into loop form and also when the slider is mounted on the shank the strand can be passed in loop form over the end of the object, with or without, but preferably with, posts and swivels for attaching the ends of the strand respectively to the shank and to the slider.

The invention also comprises the improvements to be presently described and finally claimed.

In the following description reference will be made to the accompanying drawing forming part hereof and in which, Figure 1 is a top or plan view of an instrument embodying features of the invention.

Figure 1:
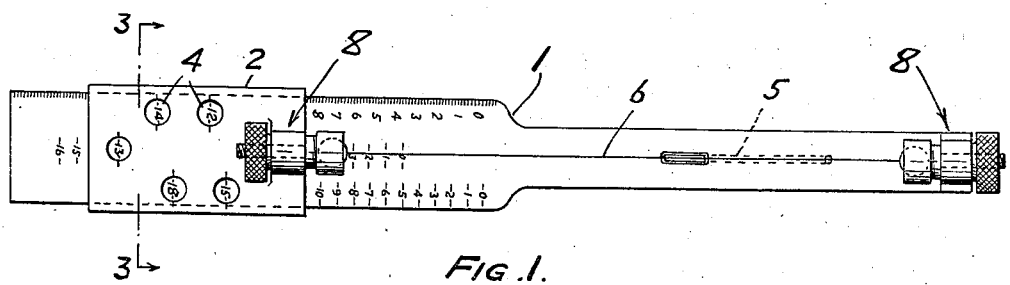

Referring to the drawing, 1 indicates a shank or scale piece. It is generally rectangular in cross section and the cross section is larger at one portion of its length, the portion toward the left in the drawing, and is smaller at the other portion of its length, the right-hand portion in the drawing. The shank or scale piece is provided with scale markings of which three are shown and which adapt the instrument for use with various objects. 2 indicates a slider provided with inturned flanges 3 by which it is movably attached to the larger portion of the shank 1 and which permit the slider to be removed from the smaller portion of the shank 1. The slider 2 is provided with windows 4 having indices and through which the scale markings can be read. 5 indicates a latch mounted in the shank and normally in position to prevent the slider from reaching the narrow part of the shank but adapted when released to permit the slider to reach the narrow portion of the shank so that it can be removed or detached from the shank. 6 indicates a flexible measuring strand as of wire or the like and one end of the strand 6 is attached to the slider 2 and the other end is attached to the shank 1. For this purpose use is made of a post 7 and a swivel 8. The swivel 8 includes a ball turnably mounted in a detachable socket 9 mounted on a shank 10 which passes through the post 7 and is provided with a finger nut 11. The purpose of this is to avoid bending of the strand 6 at its points of attachment to the slider and to the shank or scale piece 1 and also to permit of convenient renewal of the strand which can be mounted in a hole or opening provided in the ball.

While the use of the device is not necessarily limited for measuring steps formed in the insulation in the process of splicing the ends of an electrical cable or conductor, the operation of the stepping scale will be described in that connection.

Figure 2:
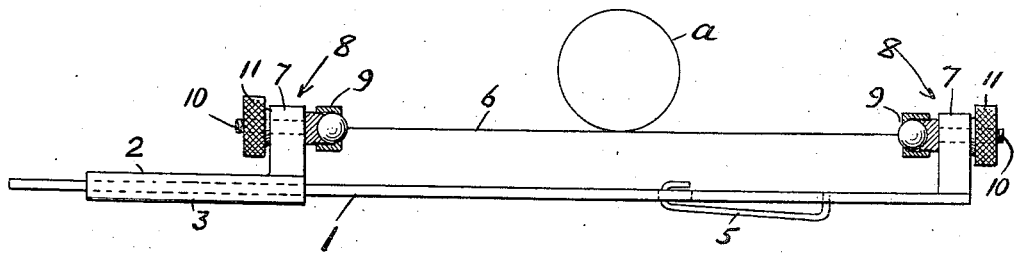
Figure 2 is a side view of the same.
Figure 3:
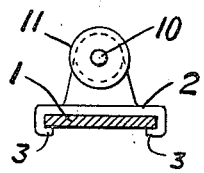
Figure 3 is a cross section taken on the line 3—3 of Figure 1.

To measure the steps at the free end of the cable formed by removal of portions of the insulating wrapping, as has been mentioned, a loop is formed in strand 6, as indicated at $a$ in Figure 2, and this loop is applied over the free end of the cable to the various steps, and by adjustment of the slider the perimeter of the step to be measured is ascertained by reference to the scale markings on the shank through the appropriate window. If the ends of the metal cores of the cable have been united a loop is formed around the desired step, formed by removal of the insulation, by manipulating the latch 5 and pushing the slider to the smaller portion of the shank from which it can be lifted off and passed around the cable along with the strand 6 and then replaced on the shank and moved to the larger portion thereof and in that position the scale markings can be read in the manner above indicated.

It will be obvious to those skilled in the art to which the invention relates that modifications may be made in details of procedure and in matters of mere form without departing from the spirit of the invention which is not limited to such matters or otherwise than the prior art and the appended claims may require.

I claim:

1. A stepping rule consisting of a shank provided with scale markings, a slider movably and laterally detachably mounted on the shank and separable therefrom and having windows and indices, a loopless measuring strand having one end attached to the shank and the other end attached to the slider with the middle part free so that one end of it along with the slider when separated from the shank can be passed around an object into loop form and the slider and then returned to the shank and again attached thereto.

2. A stepping rule consisting of a shank having relatively large and relatively small portions and provided with scale markings, a flanged slider movably attachable to the larger portion of the shank and detachable from the smaller portion of the shank and having windows and indices, a measuring strand having one end attached to the shank and the other end attached to the slider, and posts and swivels for attaching the ends of the measuring strand respectively to the shank and slider.

3. A stepping rule consisting of a shank having a relatively large and a relatively small portion and provided with scale markings, a flanged slider movably attachable to the large portion of the shank and detachable from the small portion of the shank and having windows and indices, a latch provided in the shank and adapted for co-operation with the slider, and a measuring strand having its ends connected respectively to the slider and to the shank.

CHARLES M. DALEY, Jr.